United States Patent
Winter et al.

(10) Patent No.: US 9,455,987 B2
(45) Date of Patent: Sep. 27, 2016

(54) METHOD, SYSTEM AND APPARATUS FOR GEO-VERIFICATION

(71) Applicant: CLIENT CARE AUDIT INC., Cambridge (CA)

(72) Inventors: Ryan Winter, Cambridge (CA); Kundan Joshi, Toronto (CA)

(73) Assignee: CLIENT CARE AUDIT INC., Cambridge, CA (US)

( * ) Notice: Subject to any disclaimer, the term of this patent is extended or adjusted under 35 U.S.C. 154(b) by 0 days.

(21) Appl. No.: 14/688,569

(22) Filed: Apr. 16, 2015

(65) Prior Publication Data
US 2015/0304325 A1    Oct. 22, 2015

Related U.S. Application Data

(60) Provisional application No. 61/980,851, filed on Apr. 17, 2014.

(51) Int. Cl.
*H04L 29/06* (2006.01)
*G06F 21/62* (2013.01)

(52) U.S. Cl.
CPC ....... *H04L 63/0876* (2013.01); *G06F 21/6218* (2013.01); *H04L 63/107* (2013.01); *G06F 2221/2111* (2013.01); *G06F 2221/2141* (2013.01)

(58) Field of Classification Search
CPC .............. G06F 21/6218; G06F 2221/2111; G06F 2221/2141; H04L 63/0876; H04L 63/107; H04W 4/02; H04W 4/021; H04W 48/04

USPC ............................................................. 726/7
See application file for complete search history.

(56) References Cited

U.S. PATENT DOCUMENTS

| | | | |
|---|---|---|---|
| 2004/0166878 A1* | 8/2004 | Erskine ................ | H04W 48/04 455/456.1 |
| 2008/0235375 A1* | 9/2008 | Reynolds .............. | G06Q 30/02 709/225 |
| 2014/0099920 A1* | 4/2014 | Belanger .............. | H04L 63/107 455/411 |
| 2014/0208440 A1* | 7/2014 | Kelley ............. | G06F 17/30424 726/29 |

* cited by examiner

*Primary Examiner* — Yogesh Paliwal
(74) *Attorney, Agent, or Firm* — Perry + Currier Inc.; Kristjan Spence

(57) ABSTRACT

A method, system and apparatus are provided for geo-verification for access to data stored in a memory of a server having a processor and a network interface connected to the memory. The method includes: storing, in the memory, access control data including an approved geographic area; receiving at the processor, from a client computing device via the network interface, a request for access to the data, the request containing a client location of the client computing device, the client location including global positioning system (GPS) coordinates; comparing, at the processor, the client location to the approved geographic area; when the client location is within the approved geographic area, permitting access to the data for the client computing device via the network interface; and when the client location is not within the approved geographic area, denying the request.

16 Claims, 9 Drawing Sheets

What age category do you fall under?

504

A. Less than 18 years old
B. 19-24 years old
C. 25-44 years old
D. 45-64 years old
E. 65 years or older

508

500

Locations

| Address | City | Province | Country | Postal/Zip Code | Lat/long | Status | Actions |
|---|---|---|---|---|---|---|---|
| 1045 Elgin St N | Cambridge | Ontario | Canada | N1R 8J4 | 43.391181, -80.303778 | Active | ✏ ✖ |
| 507 King St E | Cambridge | Ontario | Canada | N3H 3N4 | 43.397195, -80.361044 | Active | ✏ ✖ |
| 210 Pinebush Road | Cambridge | Ontario | Canada | N1R 8A9 | 43.411552, -80.308108 | Active | ✏ ✖ |

FIG. 6

METHOD, SYSTEM AND APPARATUS FOR GEO-VERIFICATION

CROSS-REFERENCE TO RELATED APPLICATION

This application claims priority from U.S. provisional patent application No. 61/980,851, filed Apr. 17, 2014, the contents of which is incorporated herein by reference.

FIELD

The specification relates generally to data access control, and specifically to a method, system and apparatus for location-based access control.

BACKGROUND

A wide variety of data may be stored in centralized locations and accessible from client devices. In many systems, information such as passwords is required to access such data. However, the data may be accessed in insecure locations, or in locations with prohibitive bandwidth costs.

Further, some systems permit clients to upload data to the above-mentioned centralized locations. However, detecting or (preferably) preventing the upload of fraudulent or incorrect data is difficult.

BRIEF DESCRIPTIONS OF THE DRAWINGS

Embodiments are described with reference to the following figures, in which:

FIG. 6 depicts a further interface presented by the client device of FIG. 1 during the performance of the method of FIG. 3, according to a non-limiting embodiment;

DETAILED DESCRIPTION OF THE EMBODIMENTS

Figure 1:
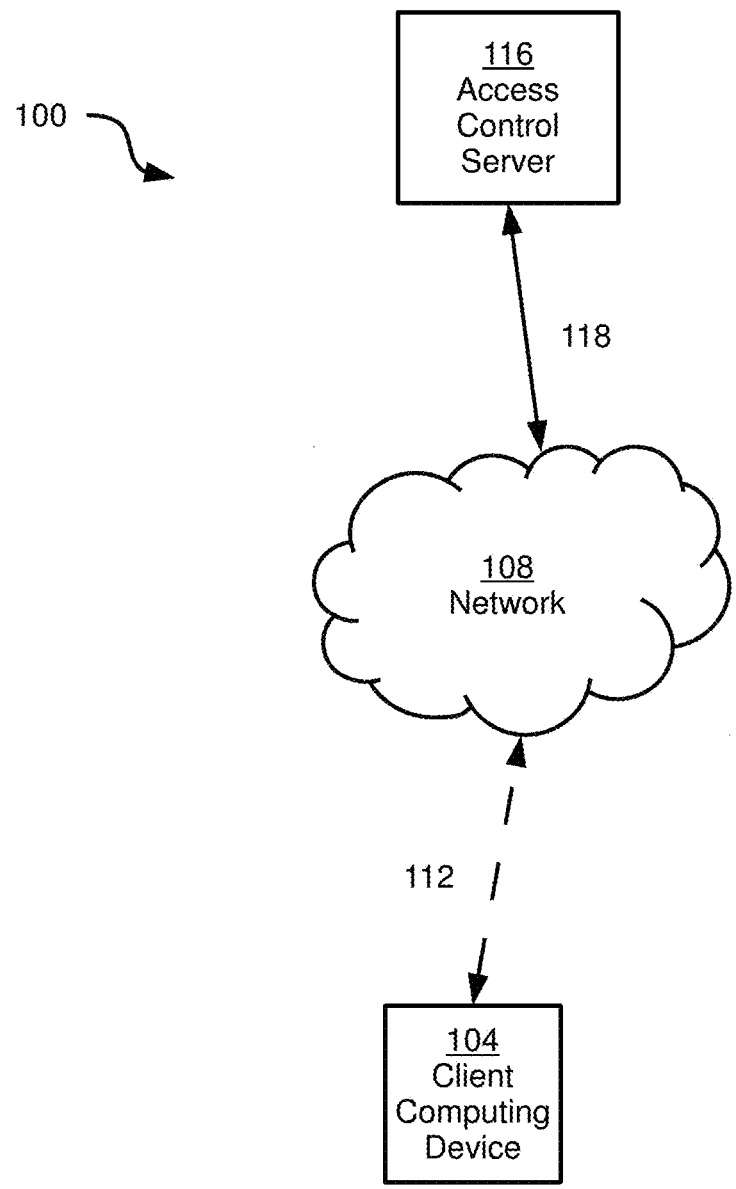
FIG. 1 depicts a communication system, according to a non-limiting embodiment.

FIG. 1 depicts a communications system 100, including at least one client computing device 104 (also referred to herein as computing device 104, client device 104, or simply device 104). Additional computing devices (not shown) can be included in system 100. Computing device 104 can be any of a cellular phone, a smart phone, a tablet computer, a desktop computer, and the like.

Computing device 104 is connected to a network 108 via a link 112, which is illustrated as a wireless link but can also be a wired link, or any suitable combination of wired and wireless links. Network 108 can include any suitable combination of wired and wireless networks, including but not limited to a Wide Area Network (WAN) such as the Internet, a Local Area Network (LAN) such as a corporate data network, cell phone networks, WiFi networks, WiMax networks and the like.

Via network 108, computing device 104 can communicate with an access control server 116 (also referred to herein as server 116) connected to network 108 via a link 118. In the present example, link 118 is illustrated as a wired link, but can include any suitable combination or wired and wireless links. Server 116 stores access-controlled data and executes various actions to control the access of the data by client device 104. For example, server 116, by executing the above-mentioned actions, can control whether (or when) client device 104 can download some or all of the data via network 108 for viewing at client device 104. As a further example, server 116 can control whether or when client device can update (e.g. edit) the access-controlled data.

Before a detailed discussion of the operation of system 100 is provided, certain components of client device 104 and server 116 will be described with reference to FIG. 2.

Figure 2:
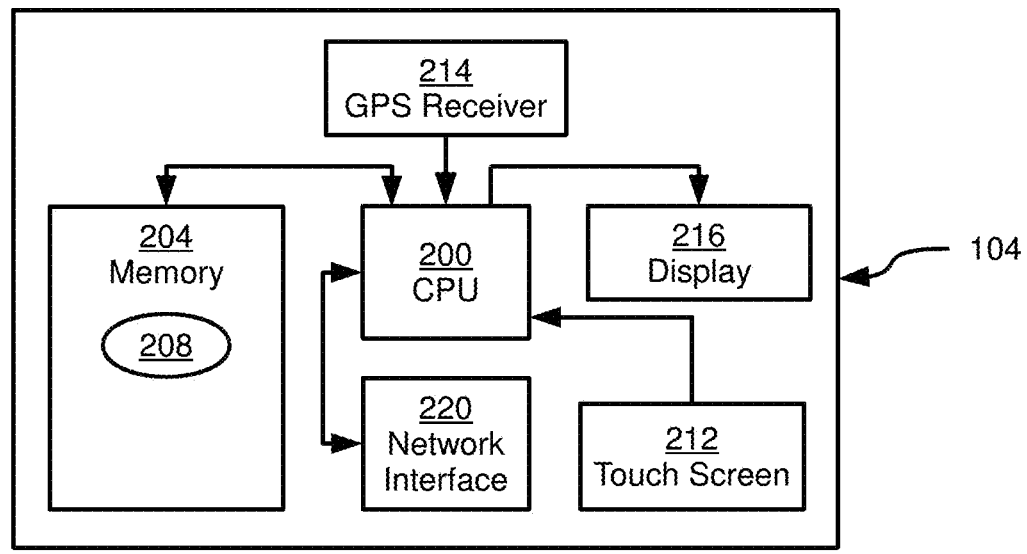
FIG. 2 depicts a client device and a server of the system of FIG. 1, according to a non-limiting embodiment.
Figure 2:
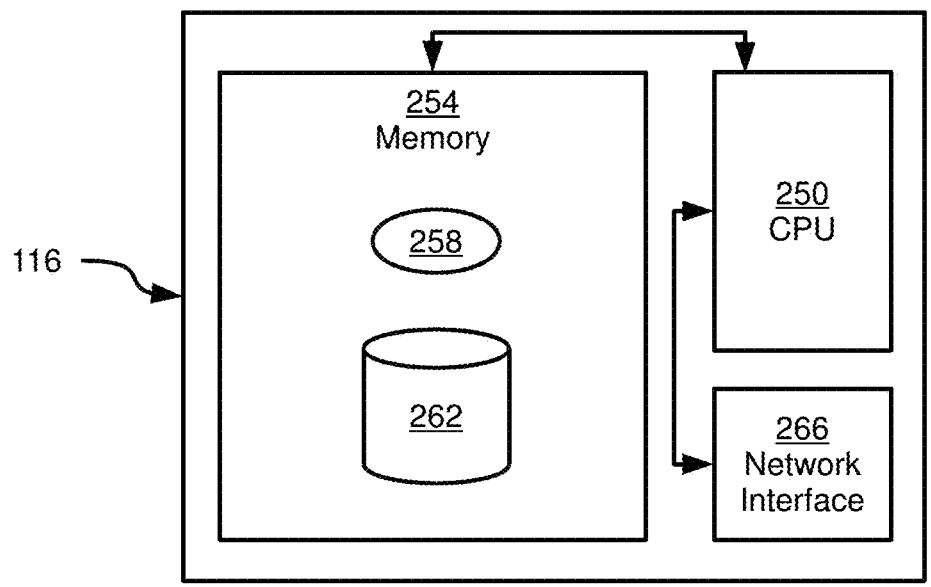

Referring now to FIG. 2, client device 104 includes a central processing unit (CPU) 200, also referred to herein as processor 200, interconnected with a memory 204. Memory 204 stores computer readable instructions executable by processor 200, including a data access application 208. Application 208 can be a web browser, a purpose-built application for interacting with server 116, or a combination thereof. In some examples, more than one application may be present in memory 204 and used to interact with server 116. In addition, it will now be apparent to those skilled in the art that memory 204 can store other applications (e.g. an operating system).

Processor 200 and memory 204 are generally comprised of one or more integrated circuits (ICs), and can have a variety of structures, as will now occur to those skilled in the art (for example, more than one CPU can be provided). Processor 200 executes the instructions of application 208 to perform, in conjunction with the other components of mobile computing device 104, various functions related to accessing data at server 116. Client device 104 is therefore said to be configured to perform those functions—it will be understood that client device 104 is so configured via the processing of the instructions in application 208 by the hardware components of mobile computing device 104 (including processor 200 and memory 204).

Client device 104 also includes at least one input device interconnected with processor 200. In the present example, input devices in the form of a touch screen 212 and a GPS receiver 214 are shown connected with processor 200. Client device 104 can also include other input devices in addition to (or instead of) touch screen 212, such as any suitable combination of a camera, a microphone, a keyboard, and the like (not shown).

Client device 104 also includes at least one output device interconnected with processor 200, such as a display 216 (in the present example, display 216 is integrated with touch screen 212). Other output devices can also be provided, such as a speaker (not shown). Client device 104 also includes a network interface 220 interconnected with processor 200, which allows client device 104 to connect to network 108 via link 112. Network interface 220 thus includes the necessary hardware, such as radio transmitter/receiver units, network interface controllers and the like, to communicate over link 112.

Still referring to FIG. 2, server 116 includes a central processing unit (CPU) 250, also referred to herein as processor 250, interconnected with a memory 254. Memory 254 stores computer readable instructions executable by processor 250, including an access control application 258. Processor 250 and memory 254 are generally comprised of one or more integrated circuits (ICs), and can have a variety of structures, as will now occur to those skilled in the art (for example, more than one CPU can be provided). Processor 250 executes the instructions of application 258 to perform, in conjunction with the other components of server 116, various actions related to controlling access to data in memory 254 by client device 104 (and other devices, when such other devices are present). In the discussion below of those functions, server 116 is said to be configured to perform those functions, or to be operating to perform those functions—it will be understood that server 116 is so configured via the processing of the instructions in application 258 by the hardware components of server 116 (including processor 250 and memory 254).

Memory 254 can also store client data to be accessed by client device 104, as well as access control data used to control access to the client data. In the present example, the client data and access control data are stored in a database 262. In other embodiments, however, the client data and access control data can be stored in separate databases in memory 254. In still further embodiments, server 116 can be distributed across more than one physical device, and thus the client data and access control data can be similarly distributed.

Server 116 also includes a network interface 266 interconnected with processor 250, which allows server 116 to connect to network 108 via link 118. Network interface 266 thus includes the necessary hardware, such as network interface controllers and the like, to communicate over link 118. Server 116 can also include input and output devices interconnected with processor 250, such as a keyboard, a mouse and a display (not shown). In some embodiments, such input and output devices can be connected to processor 250 via network 108 and another computing device. In other words, the input and output devices of server 116 can be local to server 116 or remote.

Figure 3:
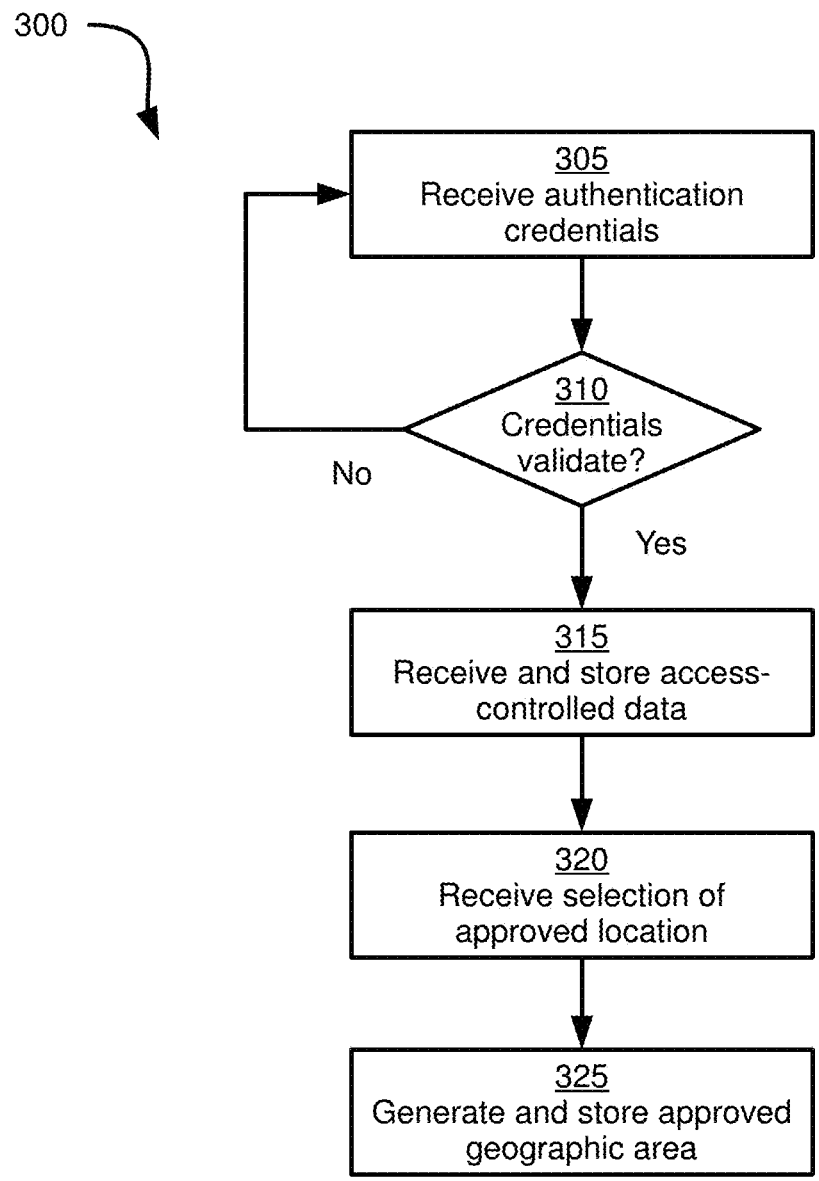
FIG. 3 depicts a method of generating access control data, according to a non-limiting embodiment.

Turning now to FIG. 3, a method 300 of generating access control data is illustrated. Method 300 will be described in conjunction with its performance in system 100, and more specifically by server 116. That is, the blocks of method 300 are performed by processor 250, via the execution of application 258 and in conjunction with the other components of server 116 discussed above.

At block 305, server 116 is configured to receive authentication credentials from client device 104, via network 108. In other words, at block 305 server 116 is configured to receive a login request. The nature of the authentication credentials is not particularly limited. For example, the authentication credentials can include an account name and a password. The request can be generated at client device 104 via execution of application 208. As mentioned earlier, application 208 can be a web browser or a separate application. When application 208 is not a web browser, the credentials received at block 305 can nevertheless be transmitted to server 116 from device 104 in a browser session. That is, server 116 can host a web page accessible by client device 104 via execution of a web browser separate from application 208.

It will now be apparent to those skilled in the art that prior to the performance of block 305, server 116 can receive a request to create an account via network 108 (for example, from client device 104). Following such a request, server 116 can prompt client device 104 (e.g. by sending a web page to client device 104 with fields into which data may be entered through the operation of touch screen 212) to create authentication credentials for the account. In some embodiments, the account may also be associated with specifically identified client devices. The authentication credentials (e.g. account name, password, device identifiers if required) are stored in memory 254.

At block 310, server 116 is configured to compare the received authentication credentials to the credentials stored in memory 254 to determine whether the credentials received at block 305 match any credentials stored in memory 254. If the determination at block 310 is negative, the login attempt fails, and the performance of method 300 can terminate, or can return to block 305.

When the determination at block 310 is affirmative, however, the performance of method 300 proceeds to block 315. At block 315, server 116 is configured to receive access-controlled data from client device 104 via network 108. As with the authentication credentials mentioned above, the access-controlled data can be sent by client device 104 via the execution of application 208 or via the execution of a separate web browser application.

The nature of the access-controlled data is not particularly limited. The access-controlled data can include any suitable combination of files (e.g. word processing documents, media files such as images, audio and video files) containing a wide variety of data. Non-limiting examples of such files include patient healthcare data, airline flight plans or other transportation planning data, educational material (e.g. textbooks, course notes and the like). Further, the access-controlled data can contain fields into which additional data may be entered. In other words, the access-controlled data can include forms, questionnaires and the like which can be updated at a later point. Examples of such access-controlled data include surveys, voting questionnaires, educational questionnaires (e.g. multiple-choice tests), financial forms (e.g. for effecting transfers of funds), and the like.

Figure 4:
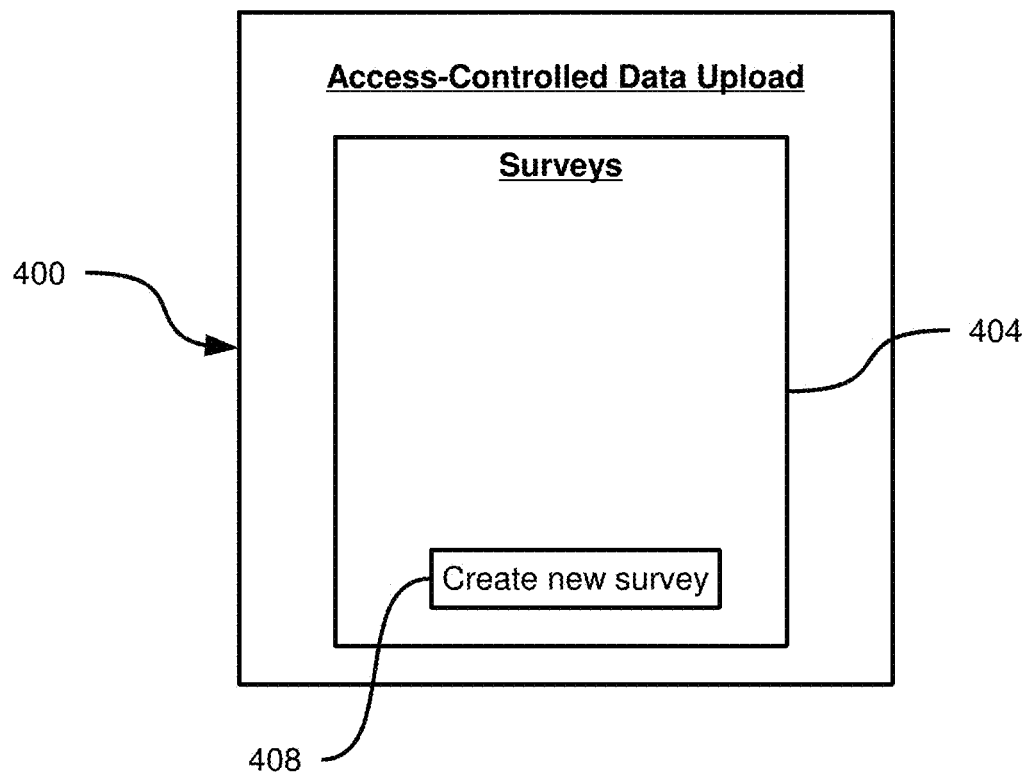
FIG. 4 depicts an interface presented by the client device of FIG. 1 during the performance of the method of FIG. 3, according to a non-limiting embodiment.

Server 116 can enable the receipt of access-controlled data by serving pages to client device 104 (e.g. web pages) prompting client device 104 to identify (e.g. by providing server 116 with a location in memory 204 from which the access-controlled data can be uploaded to server 116) or create the access-controlled data. For example, referring to FIG. 4, a page 400 is illustrated as presented on display 216 of client device 104. Page 400 includes a list 404 (currently empty) of existing access-controlled data (i.e. client data) stored at server 116. In the present example, the client data includes one or more surveys, for example to elicit customer feedback (e.g. in a restaurant). In addition, page 400 includes a selectable element 408 for creating a new item of client data, such as a new survey.

Figure 5:
FIG. 5 depicts another interface presented by the client device of FIG. 1 during the performance of the method of FIG. 3, according to a non-limiting embodiment.

Selection of element 408 at client device 104 (e.g. via touch screen 212) causes client device 104 to send an instruction to server 116, in response to which server 116 can provide client device 104 with a further page, such as a page listing a set of templates for creating surveys. Subsequent pages can be served to client device 104 by server 116 to complete the creation of a survey, or indeed any other type of client data. Thus, the receipt of client data at block 315 can include receiving one or more survey questions with accompanying response fields (e.g. a set of multiple choice responses, a text field, and the like). FIG. 5 depicts an example page 500 served to client device 104 for generating a survey question 504 and selectable answers 508.

The receipt of client data at block 315 can also include receiving any of a wide variety of files (e.g. word processing, media files and the like). As a further example, the receipt of client data at block 315 can include a voting-specific survey, including one or more electoral position names, and a set of selectable candidate names for each position. The received client data can also include any suitable combination of the above.

In other embodiments, rather than being created via pages served by server 116, the client data can be created entirely at client device 104 (for example, application 208 can include various survey templates) and transmitted to server 116 upon completion.

Upon receipt of the client data, server 116 is configured to store the client data in database 262 in association with the account that was authenticated at blocks 305 and 310. An example of database 262 is shown below, following the receipt of a survey at block 315.

TABLE 1

Example Database 262 Upon Receipt of Client Data

| Account ID | Client Data | Client Data Code | Approved Area |
|---|---|---|---|
| 104 | Survey_1 | 1234 | |

As seen above, the client data (Survey_1) received at block 315 is stored in database 262 in association with the account identifier (104) corresponding to client device 104. It will be understood by those skilled in the art that the account identifier need not correspond to an individual device, as shown above. Database 262 can contain the client data itself, or can include a pointer to a storage location in memory 254 containing the client data.

In addition, as shown in Table 1 each item of client data can include a code identifying that item (thus, the code 1234 identifies the client data Survey_1). The code can be provided by client device 104, and can take a wide variety of forms, or can simply be omitted. Further, database 262 can include an approved geographic area corresponding to each item of client data, or to all client data associated with the account. The approved area field is currently blank.

Returning to FIG. 3, having received and stored the client data at block 315, server 116 is configured to receive a selection of an approved location from client device 104. The approved location can be received in a variety of formats. For example, the approved location can be received from client device 104 as a set of GPS coordinates, a street address, or the like. The selection of the approved location at client device 104 can be made in a variety of ways. For example, client device 104 can present a map (e.g. supplied by server 116 or by another device) on display 216, and receive a selection via touch screen 212 of a location on the map. In other embodiments, client device 104 can provide server 116 with its current location, as determined by GPS receiver 214.

Having received the selected location from client device 104, server 116 is configured, at block 325, to generate and store an approved geographic area based on the selected location received at block 320. The generation of an approved geographic area at block 325 includes converting the selected location to GPS coordinates, if necessary (e.g. if the selected location was a street address), and converting the selected GPS location into an area. Converting the selected GPS location into an area can include adding a radius (e.g. a radius of two kilometers) to the selected GPS location, or generating any other suitably-shaped area centered on the selected GPS location. The approved geographic area is stored in database 262, in association with the client data. Approved geographic areas can be specific to individual items of client data, or can be general to an entire account in database 262. Table 2 shows an updated version of Table 1, following the generation of the approved geographic area at block 325.

TABLE 2

Example Database 262 Upon Generation of Location

| Account ID | Client Data | Client Data Code | Approved Area |
|---|---|---|---|
| 104 | Survey_1 | 1234 | X, Y (2 km radius) |

It is also contemplated that client device 104 can add additional locations, and edit or delete existing locations. For example client device 104 can request a list of approved areas or locations from server 116 at any time, and edit those locations. For example, referring to FIG. 6, a page 600 served to client device 104 from server 116 lists the selected locations (in both street address and GPS formats) currently associated with the account authenticated at blocks 305 and 310. Blocks 320 and 325 can be repeated as necessary to update the available locations. In some embodiments, the number of locations available to client device 104 may be limited by a number of licenses stored in database 262. Thus, server 116 can be configured to determine, before generating a new approved geographic area, whether client device 104 is permitted to create another approved geographic area.

Following the performance of block 325, method 300 is complete. As noted above, blocks 320 and 325 can be repeated. Further, block 315 can also be repeated as desired, if additional items of client data are to be uploaded to server 116. As will be apparent from the discussion above, the performance of method 300 results in client data being stored at server 116, in association with an approved geographic area. As will be seen below, the approved geographic area is employed by server 116 to permit or deny access to the client data.

Figure 7:
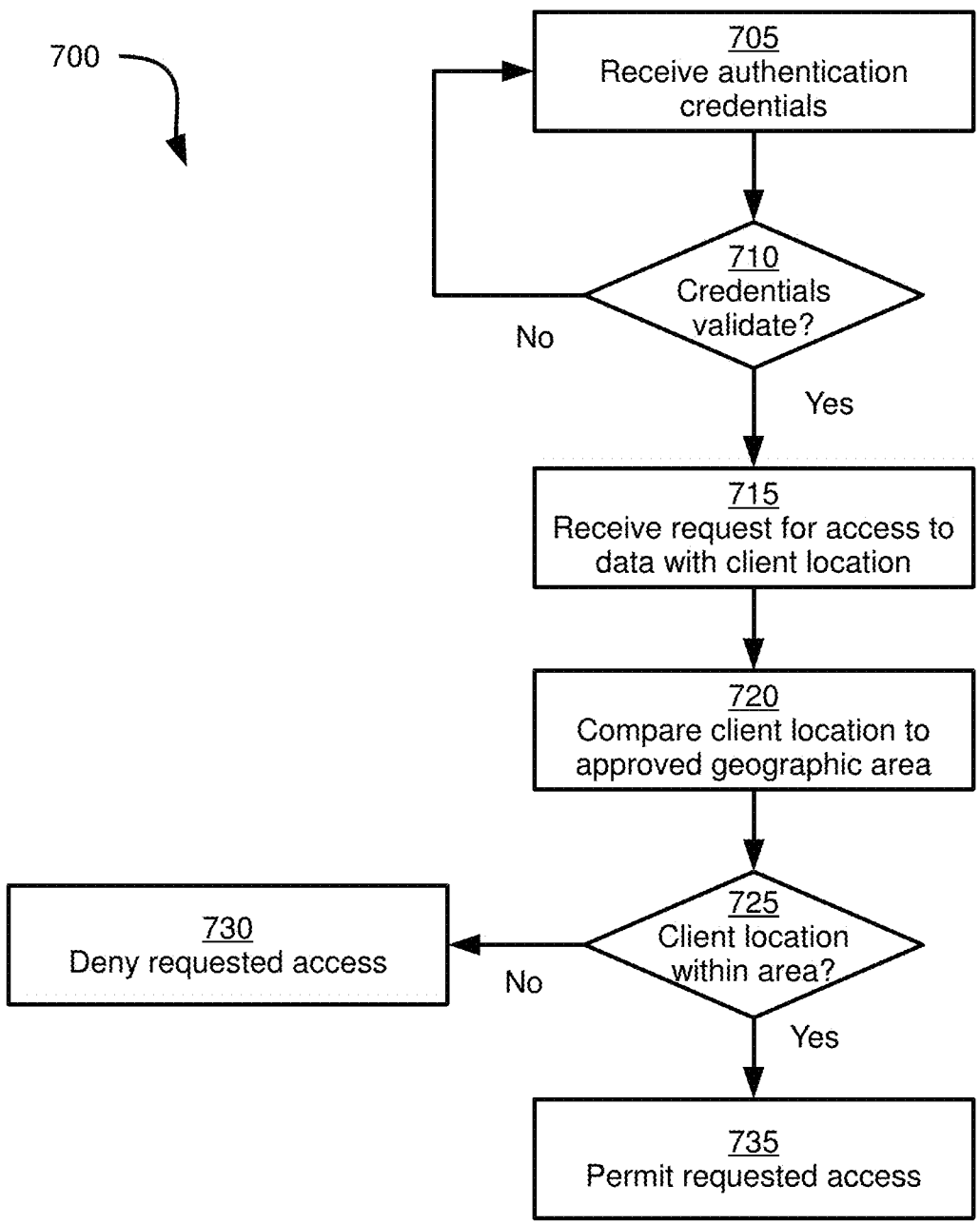
FIG. 7 depicts a method of controlling access to client data, according to a non-limiting embodiment.

Referring now to FIG. 7, a method 700 of controlling access to the above-mentioned client data stored at server 116 is illustrated. In other words, method 700 is a method of performing geo-verification before granting access to data. Method 700 will be described in conjunction with its performance in system 100, and more specifically by server 116. That is, the blocks of method 700 are performed by processor 250, via the execution of application 258 and in conjunction with the other components of server 116 discussed above.

At blocks 705 and 710, server 116 receives and validates authentication credentials from client device 104, as described above in connection with blocks 305 and 310.

When the credentials received at block 705 are validated, performance of method 700 proceeds to block 715. At block 715, server 116 is configured to receive a request for access to client data. The request is received from client device 104, and includes a client location. The client location includes at least the current GPS coordinates of client device 104, as determined by GPS receiver 214. The client location can also include additional location data, such as signal strength fingerprinting data (e.g. WiFi fingerprint) in combination with a street address (e.g. for locations in which GPS signal penetration is too low for receiver 214 to operate). In general, the client location received at block 715 is suitable for comparison to the GPS-based approved geographic areas in database 262 (it is contemplated that some conversion of client location may be necessary before making the above-mentioned comparison).

The request received at block 715 can also include an identifier of the item or items of client data to which access is required. In some embodiments, after block 710 and prior to block 715, server 116 can provide client device 104 with a list of client data items associated with the account validated at block 710. Client device 104 can receive a selection of one or more items (e.g. via touch screen 212) and transmit the selection to server 116.

Figure 8:
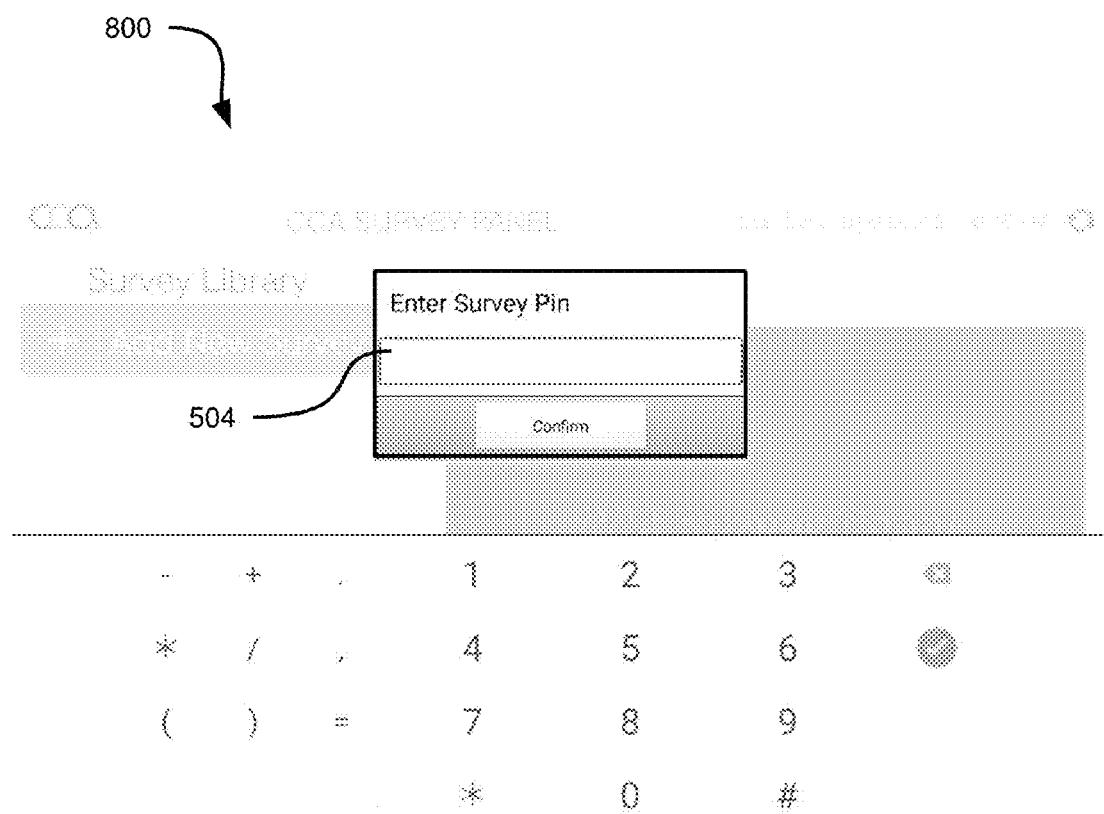
FIG. 8 depicts an interface presented by the client device of FIG. 1 during the performance of the method of FIG. 7, according to a non-limiting embodiment.

In other embodiments, it may not be desirable to send a list of available items to client device 104 (e.g. for security reasons, or to reduce bandwidth consumption). Thus, the request may include a client data code, which can be compared at server 116 to the code shown in Tables 1 and 2 above. FIG. 8 shows an example interface 800 presented on display 212 for entering a code to transmit to server 116 in a field 804.

At block 720, server 116 is configured to compare the client location received at block 715 to the approved geographic area stored in database 262 that corresponds to either the requested client data or the account validated at blocks 705 and 710. When the comparison reveals at block 725 that the client location is outside the approved geographic area (including when the client location is null, for example if no GPS signal is available), performance of method 700 proceeds to block 730, and server 116 is configured to deny the requested access. When the comparison reveals at block 725 that the client location is within the approved geographic area, performance of method 700 proceeds to block 735 and server 116 is configured to permit the requested access.

Denial of access can be implemented by server 116 by, for example, transmitting a message to client device 104 stating that access is denied. Permission of access can be implemented in a variety of ways by server 116, depending at least in part on the nature of the request at block 715.

In general, the request for access at block 715 can be a request to view (e.g. download) client data stored at server 116, or a request to update client data stored at server 116. When the request received at block 715 is a request to view a file or other item of client data, at block 735 server 116 can retrieve the requested client data and transmit the client data to client device 104.

When, on the other hand, the request received at block 715 was a request to update client data, at block 735 server 116 can send a message to client device 104 instructing client device 104 to transmit the desired updates to server 116. In other embodiments, the updated data can be included in the request received at block 715, and at block 735 server 116 can permit access by committing the updated data to memory 254.

After the performance of blocks 730 or 735, the performance of method 700 terminates. Further performances of method 700 can be initiated; in some embodiments, blocks 715-735 can be repeated without the need to repeat the performance of blocks 705 and 710.

To further illustrate the performance of method 700, two subsequent performances of method 700 will be discussed. In the first performance, following a successful authentication for the account "104" server 116 receives a request for the survey "Survey_1" at block 715. For example, the request can include the code 1234 as an identifier for Survey_1. The request also includes the GPS location of client device 104. Assuming the client location is within the approved area shown in Table 2, at block 735 server 116 is configured to retrieve the relevant survey from memory 254 and transmit the survey to client device 104. Client device 104 can then be presented to an operator for completion of the survey (e.g. for selection of one of the answers 508 shown in FIG. 5).

Upon completion of the survey, client device 116 initiates a further performance of method 700, beginning at block 715, by transmitting a request to submit a set of answers in association with Survey_1 for storage at server 116. The second request can therefore include the same code as mentioned above, as well as another client location (as client device 104 may have moved since retrieving the survey from server 116). If the determination at block 725 is negative for this second performance, client device 104 is prevented from uploading the set of survey answers. The answers can be maintained in memory 204 until successfully submitted (e.g. when client device 104 has moved to an acceptable location).

In some embodiments, only certain types of access can be controlled by location. For example, in the case of surveys, it is contemplated that the survey may be provided to client device 104 without location-based access control (i.e. omitting blocks 720 and 725), but that location-based access control is implemented in connection with uploading the set of answers for a completed survey. Similar principles may be applied to other types of access-controlled data. For example, voting forms may be downloaded in any location, but may only be uploaded to server 116 in an approved voting location.

Figure 9:
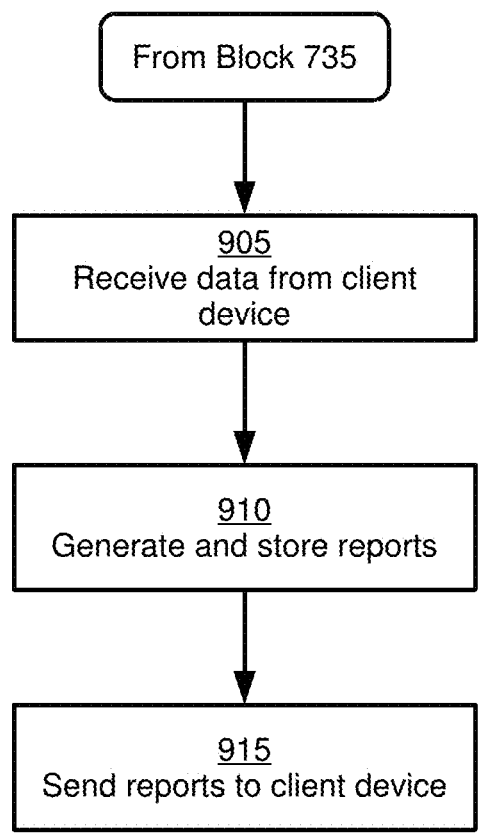
FIG. 9 depicts a continuation of the method of FIG. 7, according to a non-limiting embodiment.

Referring now to FIG. 9, when the request for access permitted at block 735 was a request to update client data, server 116 can be configured to receive the updated data (e.g. completed survey answers) at block 905. At block 910, server 116 is configured to generate and store one or more reports, for example collating a plurality of sets of answers for a given survey. The reports can be provided to client device 104, for example in response to a request from client device 104, at block 915. In some embodiments, the reports themselves can be access-controlled, such that client device 104 can only retrieve the reports when located in the approved geographic area. Additionally, in some embodiments the reports can be provided to a further server (distinct from server 116) which makes the reports available to client devices such as client device 104.

The above-described methods and systems can be advantageously applied to a variety of situations. For example, computationally efficient management of access to sensitive data (e.g. healthcare records, confidential corporate files, licensed educational materials and the like) can be achieved by the use of the location-based access control described herein, which requires both a code (such as a personal identification code, PIN) and the presence of the client device in a predetermined location (such as within a corporate office).

As a further example, system 100 can provide computationally efficient control over the submission of electoral votes. For instance, each voter client device may only be permitted to submit a completed voting card within the confines of a particular area (e.g. the designated voting location for a district or other region).

As a further example, the completion of surveys or other questionnaires (e.g. customer satisfaction surveys, secret shopper questionnaires, reviews and the like) can be controlled to permit the submission of such surveys or questionnaires only from client devices that are actually present at the relevant locations (e.g. the business being reviewed).

Thus, system 100 provides a computationally efficient way to reduce or eliminate fraudulent customer feedback. In some embodiments, server 116 can be configured to communicate with a further server hosting reviews for businesses (e.g. restaurants). Thus, the data uploaded to server 116 by client device 104 following the performance of block 735 can be forwarded to another server; the other server will receive only data that has been geo-verified.

As a still further example, financial transactions such as transfers of funds may be effected from client device 104, so long as client device 104 is within a location designated by a bank (e.g. the home branch of the operator of client device 104). For instance, the client data can include a completed financial transfer form that can only be submitted to a bank server when the client device is within the approved geographic area.

Further variations to the above are contemplated. For example, other access control parameters can be implemented in addition to those mentioned above, including time periods, operator roles, transaction limits (for financial transactions), file sizes and the like.

The scope of the claims should not be limited by the embodiments set forth in the above examples, but should be given the broadest interpretation consistent with the description as a whole.

We claim:

1. A method of geo-verification for access to data stored in a memory of a server having a processor and a network interface connected to the memory, the method comprising:
   receiving a selection of an approved location from the client computing device;
   determining whether a licensed number of approved geographic areas associated with the client computing device has been exceeded;
   generating an approved geographic area based on the selected location;
   storing, in the memory, access control data including the approved geographic area;
   receiving at the processor, from the client computing device via the network interface, a request for access to the data, the request containing a client location of the client computing device, the client location including global positioning system (GPS) coordinates;
   comparing, at the processor, the client location to the approved geographic area;
   when the client location is within the approved geographic area, permitting access to the data for the client computing device via the network interface; and
   when the client location is not within the approved geographic area, denying the request.

2. The method of claim 1, wherein permitting access to the data comprises retrieving the data from the memory and transmitting the data to the client computing device.

3. The method of claim 1, wherein the request for access includes updated data, and wherein permitting access to the data comprises storing the updated data in the memory in association with the data.

4. The method of claim 3, wherein the data includes a survey comprising a plurality of survey questions, and wherein the updated data includes a set of responses to the plurality of survey questions.

5. The method of claim 1, wherein the client location further includes at least one of a street address and a signal strength fingerprint.

6. The method of claim 1, further comprising:
   prior to receiving the request, receiving authentication credentials from the client device; and
   validating the authentication credentials against credentials stored in the memory.

7. The method of claim 1, wherein receiving the selection includes receiving a set of GPS coordinates, and wherein generating the approved geographic area includes adding a radius to the coordinates.

8. The method of claim 1, wherein receiving the selection includes receiving a street address, and wherein generating the approved geographic area includes converting the street address to GPS coordinates and adding a radius to the coordinates.

9. A server for controlling access to data by a client computing device, the server comprising:
   a memory storing the data and access control data including an approved geographic area;
   a network interface connected to the client computing device; and
   a processor connected with the memory and the network interface, the processor configured to:
      prior to storing the access control data, receiving a selection of an approved location from the client computing device;
      determining whether a licensed number of approved geographic areas associated with the client computing device has been exceeded;
      generating an approved geographic area based on the selected location;
      receive, from the client computing device via the network interface, a request for access to the data, the request containing a client location of the client computing device, the client location including global positioning system (GPS) coordinates;
      compare the client location to the approved geographic area;
      when the client location is within the approved geographic area, permit access to the data for the client computing device via the network interface; and
      when the client location is not within the approved geographic area, deny the request.

10. The server of claim 9, wherein permitting access to the data comprises retrieving the data from the memory and transmitting the data to the client computing device.

11. The server of claim 9, wherein the request for access includes updated data, and wherein permitting access to the data comprises storing the updated data in the memory in association with the data.

12. The server of claim 11, wherein the data includes a survey comprising a plurality of survey questions, and wherein the updated data includes a set of responses to the plurality of survey questions.

13. The server of claim 9, wherein the client location further includes at least one of a street address and a signal strength fingerprint.

14. The server of claim 9, the processor further configured to:
   prior to receiving the request, receive authentication credentials from the client device; and
   validate the authentication credentials against credentials stored in the memory.

15. The server of claim 9, wherein receiving the selection includes receiving a set of GPS coordinates, and wherein generating the approved geographic area includes adding a radius to the coordinates.

16. The server of claim 9, wherein receiving the selection includes receiving a street address, and wherein generating the approved geographic area includes converting the street address to GPS coordinates and adding a radius to the coordinates.

\* \* \* \* \*